Figure 1:
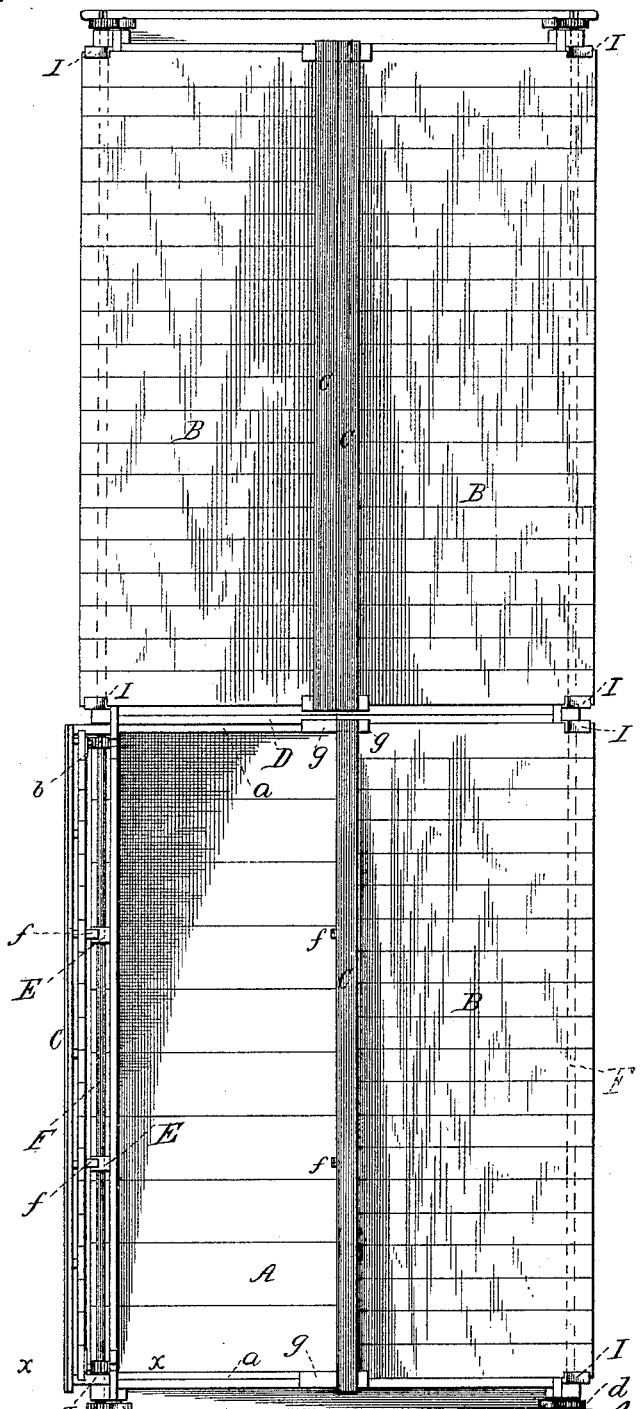

(No Model.) 2 Sheets—Sheet 1.

J. TESSEYMAN & H. A. BILLINGS.
RAILWAY CAR.

No. 327,836. Patented Oct. 6, 1885.

Witnesses:
W. C. Jordinator
E. W. Rector

Inventors:
John Tesslyman
and Henry A. Billings
by Stenrbeck
their Attorneys:

(No Model.) 2 Sheets—Sheet 2.
J. TESSEYMAN & H. A. BILLINGS.
RAILWAY CAR.
No. 327,836. Patented Oct. 6, 1885.
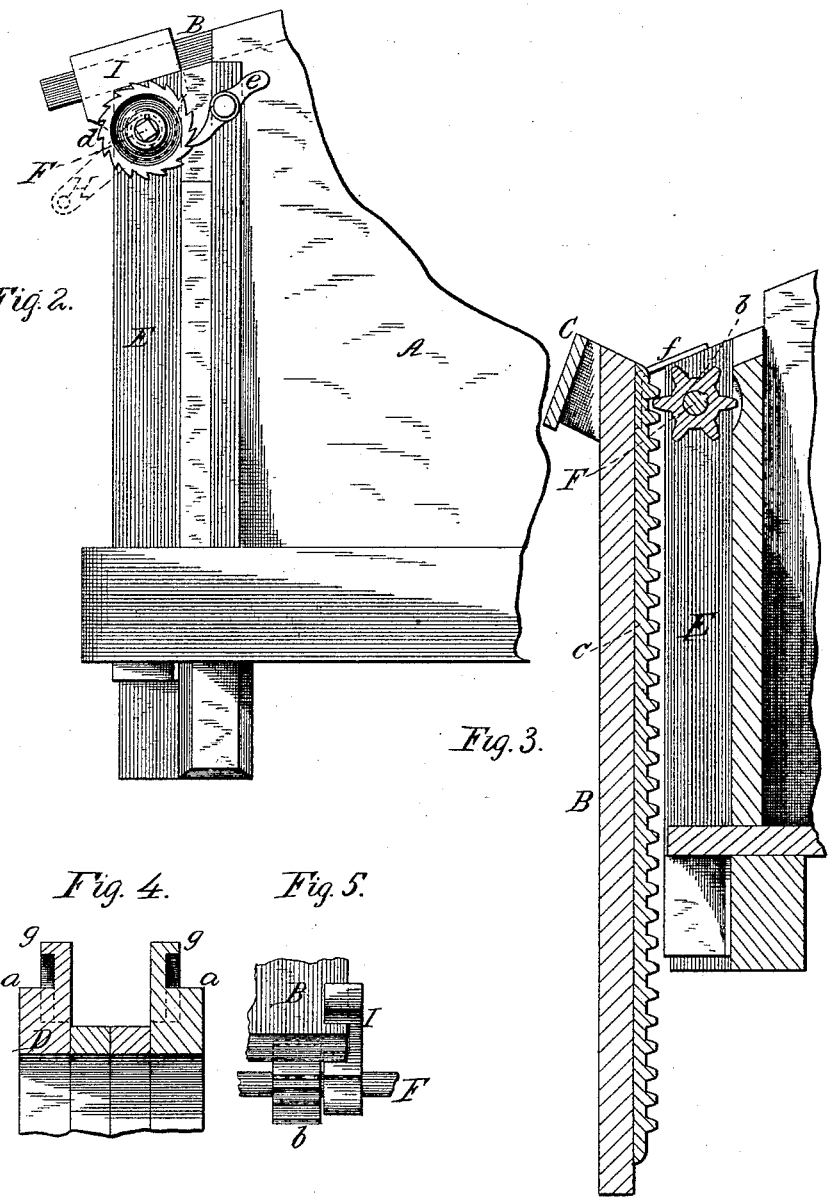
Witnesses:
Inventors:
John Tesseyman
Henry A. Billings
by Steinbeck
their Attorneys.

UNITED STATES PATENT OFFICE.

JOHN TESSEYMAN AND HENRY A. BILLINGS, OF DAYTON, OHIO.

RAILWAY-CAR.

SPECIFICATION forming part of Letters Patent No. 327,836, dated October 6, 1885.

Application filed June 11, 1885. Serial No. 168,325. (No model.)

*To all whom it may concern:*

Be it known that we, JOHN TESSEYMAN and HENRY A. BILLINGS, citizens of the United States, residing at Dayton, in the county of Montgomery and State of Ohio, have invented certain new and useful Improvements in Railroad-Cars, of which the following is a full, clear, and exact description, reference being had to the accompanying drawings, forming part of this specification.

Our invention relates to the production of sectional removable tops or roofs for railroadcars; and it is applicable to gondola, coal, grain, box, and stock cars, and has for its object the production of sectional roofs or tops, which while permanently secured to the car may be lowered so as to hang by the side of the car to uncover any portion or the whole of the same for ventilation or the introduction of contents, as may be desired, and also in the provision of simple, strong, and efficient means for operating these sectional tops.

The invention will be herein set forth and distinctly pointed out in the claims. In the accompanying drawings, Figure 1 is a plan view of a gondola-car provided with our improved removable sectional roofs, one section of which is let down and hangs by the side of the car. Fig. 2 is an enlarged detail view of one of the end corners of the car, representing the roof in its secured normal position. Fig. 3 is an enlarged sectional end elevation through the line $x\ x$ of Fig. 1. Fig. 4 is an enlarged sectional view through the apex of the central supporting-bridge. Fig. 5 is an enlarged detail in side elevation of the vibrating roof-guide.

The same letters of reference are used to indicate identical parts in all the figures.

We have illustrated in the present instance any suitable gondola-car, A, whose ends slant upward to an apex and are provided with any suitable ways, $a$, upon which the sectional roofs B rest and slide. If desired, there may be but two of these roofs to each car, each covering the half of the car longitudinally and provided on their upper sides with the usual walk-planks, C, for the trainmen. We have illustrated, however, in Fig. 1 a car having its roof in four sections, the abutting middle portions of which rest upon a bridge, D, likewise provided with sliding guide-ways.

To operate these sectional roofs we journal to the upper edges of each side, and preferably in the uprights E of the car, a horizontal shaft, F, upon which small pinions $b$ are keyed at its ends, which pinions engage and mesh with the racks $c$ secured to the under side of the sectional roofs. The shafts F project through the ends of the car and have keyed upon them ratchet-wheels $d$, with which pivoted gravitating dogs $e$ engage to hold the shaft locked when the roofs are up in place as covers for the car. Permanent or removable cranks or hand-wheels H are applied to the ends of the shafts to operate the same.

Pivoted upon the shafts F near their ends are slotted guides I, the slots of which embrace the edges of the sectional roofs, as shown.

From this construction it will be seen that to operate the roofs in lowering the same to uncover the car it is only necessary to free the dogs $e$ from engagement with the ratchets $d$, and by means of the hand wheels or cranks to rotate the shafts F and thereby, through the medium of the pinions $b$ and racks $c$, cause the roofs to slide down until, passing the center of gravity, they tip up into a vertical position, carrying with them the guides I, and continue their downward travel by gravity until they are arrested by the angle-pieces $f$, which, secured to the roofs, rest upon the tops of the uprights E, thus bringing the roofs into the position shown in Fig. 3, with their upper edges on line with the upper sides of the car.

To return the roofs it is only necessary to rotate the shafts F in an opposite direction, whereupon they will be raised, and when sufficiently raised can be tilted over the car to rest upon the guides $a$. To hold them from accidental tipping or displacement when fully thrown up, their upper edges pass under flange-pieces $g$, and the re-engagement of the dogs $e$ with the ratchets $d$ holds them securely locked.

In Fig. 1 we have shown the roofs in four sections, as before stated, and where this is done it is preferable to have each of the shafts F divided at its middle, making practically four shafts, one for each section, which can thus be separately operated, as will be readily understood.

Having thus fully described our invention, we claim—

The combination, with a car provided upon its sides with shafts F, carrying pinions b, vibrating-guides I, ratchets d, and locking-dogs e, of sectional roofs provided with racks engaging with said ratchets, and stops f, for limiting the downward movement of the roofs and supporting the same when hung by the side of the car, substantially as described.

JOHN TESSEYMAN.
HENRY A. BILLINGS.

Witnesses:
 OSCAR F. DAVISSON,
 ALVIN W. KENNLY.